United States Patent [19]

Imamura

[11] Patent Number: 5,649,985
[45] Date of Patent: Jul. 22, 1997

[54] APPARATUS FOR REMOVING HARMFUL SUBSTANCES OF EXHAUST GAS DISCHARGED FROM SEMICONDUCTOR MANUFACTURING PROCESS

[75] Inventor: Hiroshi Imamura, Suita, Japan

[73] Assignee: Kanken Techno Co., Ltd., Suita, Japan

[21] Appl. No.: 564,649

[22] Filed: Nov. 29, 1995

[51] Int. Cl.$^6$ ................................................ B01D 47/06
[52] U.S. Cl. ............................... 55/222; 55/223; 55/431; 95/225; 261/142; 261/155; 261/DIG. 54; 422/174
[58] Field of Search ............... 55/222, 223, 267–269, 55/261, 266, 282, 431, 233; 95/223–225, 227, 210, 211; 261/142, 155, DIG. 54; 422/173, 174; 118/715, 719, 722, 724

[56] References Cited

U.S. PATENT DOCUMENTS

| | | | |
|---|---|---|---|
| 3,052,105 | 9/1962 | Bowman et al. | 55/222 X |
| 3,997,294 | 12/1976 | Kritzler | 55/222 X |
| 4,467,614 | 8/1984 | Tropeano et al. | 55/222 X |
| 4,600,561 | 7/1986 | Frei | 55/222 X |
| 5,277,707 | 1/1994 | Munk et al. | 55/223 X |
| 5,405,445 | 4/1995 | Kumada et al. | 422/173 X |
| 5,567,215 | 10/1996 | Bielawski et al. | 422/173 X |

OTHER PUBLICATIONS

Heat Oxidation Decomposition Type for CVD Equipment Exhaust Gas Removal Equipment KT–1000 (brochure) Sumitomo Seika. Publication is believed to be Jul. of 1994. (Japanese and English Translations).

*Primary Examiner*—Richard L. Chiesa
*Attorney, Agent, or Firm*—Oblon, Spivak, McClelland, Maier & Neustadt, P.C.

[57] ABSTRACT

Apparatus for removing harmful substances of an exhaust gas discharged from a semiconductor manufacturing process are provided. The apparatus includes a mechanism for: removing at least one of a water-soluble component, a hydrolyzable component and dust contained in the exhaust gas discharged from semiconductor manufacturing equipment by water scrubbing; heating the water-scrubbed exhaust gas to thermally decompose a thermally-decomposable component contained therein; and removing dust generated by the thermal decomposition from the thermally-decomposed exhaust gas by water scrubbing to render the thermally decomposed exhaust gas into a clean exhaust gas.

4 Claims, 1 Drawing Sheet

APPARATUS FOR REMOVING HARMFUL SUBSTANCES OF EXHAUST GAS DISCHARGED FROM SEMICONDUCTOR MANUFACTURING PROCESS

BACKGROUND OF THE INVENTION

1. Field of the Invention

The present invention relates to a method for effectively removing harmful and toxic substances of a generally highly metal-corrosive exhaust gas with or without dust discharged from a semiconductor manufacturing process, which exhaust gas particularly contains one or more component gases that are harmful and toxic to human, and flammable or explosive, and that are hydrolyzable, water-soluble or thermally decomposable. The invention further relates to a compact apparatus for removing harmful and toxic substances of such an exhaust gas utilizing the above method, which apparatus can be used along with a semiconductor manufacturing apparatus in a clean room.

2. Discussion of the Background

An exhaust gas discharged from a semiconductor manufacturing process is generally highly metal-corrosive, is flammable and explosive, and contains substances that are harmful and toxic to human beings. It is a conventional practice to dilute such an exhaust gas with a large amount of nitrogen gas to reduce the exhaust gas concentration to a level lower than an lower explosion limit (LEL) and mix the diluted exhaust gas with an extremely large amount of air before the exhaust gas is discharged into the atmosphere.

With the recent increased awareness with respect to the environmental protection, severer administrative measures for the environmental protection have been taken to strictly regulate the discharge of such exhaust gas to the atmosphere. Accordingly, there is a need to positively remove harmful substances of the exhaust gas discharged from a semiconductor manufacturing process.

Examples of various methods proposed so far for positively removing harmful substances from the exhaust gas include:

(1) scrubbing the exhaust gas by a scrubber method using a basic or acidic agent (in general, an alkaline agent such as caustic soda);

(2) removing harmful component gases by allowing the exhaust gas to pass through layers of adsorbents capable of chemically combining with the harmful component gases;

(3) employing a dry thermal oxidation method in which the exhaust gas is introduced into a flame atmosphere charged with a large amount of hydrogen gas to remove harmful substances; and (4) employing another dry thermal oxidation method in which the exhaust gas together with oxygen gas (air), nitrogen gas or a like gas is introduced concentrically into a cylindrical electric column heater to decompose harmful substances.

These methods, though having some advantages, involve the following problems, and are required to be further improved by users.

The method (1) is suitable for the treatment of an exhaust gas at a high discharge rate. However, the application thereof is limited to hydrolyzable exhaust gases, and no effect is enjoyed against non-hydrolyzable exhaust gases. More specifically, it is extremely difficult to reduce the concentration of exhaust gas containing non-hydrolyzable gases to a level lower than the threshold limit value (TLV) determined by international standards. Therefore, it is a current practice to mix the treated exhaust gas having a concentration higher than the TLV with an extremely large amount of air before the discharge thereof into the atmosphere.

In accordance with the method (2), exhaust gas is introduced into an adsorption column. The adsorption column has a limited adsorption capacity, thereby requiring column replacement when the adsorption capability thereof is lost. The column replacement entails dangerous operations and disposal of absorbent, resulting in an increased running cost.

In accordance with the method (3), exhaust gas is oxidized in a hydrogen flame atmosphere. Though the effectiveness and treatment capacity of this method have been appreciated, this method involves a safety problem concerning the handling of the hydrogen flame in a semiconductor manufacturing plant. To provide an appropriate safeguard thereagainst, the running cost is increased.

The method (4) which employs a cylindrical column heater suffers from limitations in the heat transfer to exhaust gas and the treatment capacity. Therefore, it is difficult to satisfy various requirements for a semiconductor manufacturing plant. Further, this method involves practical problems such that a hydrolyzable component, acidic component or basic component of the exhaust gas cannot be effectively removed, and dust generated in the exhaust gas cannot be sufficiently removed over a long time.

It is, therefore, a primary object of the present invention to provide a method and apparatus capable of safely and assuredly removing harmful substances of exhaust gas discharged from a semiconductor manufacturing process, which requires a reduced running cost and ensures a stable operation during a prolonged continuous use.

It is another object of the present invention to provide method and apparatus capable of reducing the concentration of any kind of harmful component of exhaust gas to a level lower than the TLV thereof to meet various requirements of semiconductor manufacturing.

It is still another object of the present invention to provide a compact apparatus for removing harmful substances of exhaust gas, which can be used in side-by-side relation to a semiconductor production apparatus in a clean room.

SUMMARY OF THE INVENTION

In accordance with a first feature of the present invention, there is provided a method for removing harmful substances of an exhaust gas (F1) discharged from a semiconductor manufacturing process, comprising the steps of: removing at least one of a water-soluble component, a hydrolyzable component and dust contained in the exhaust gas discharged from semiconductor manufacturing equipment by water scrubbing; heating the water-scrubbed exhaust gas (F2) to thermally decompose a thermally-decomposable component contained therein; and removing dust generated by the thermal decomposition from the thermally-decomposed exhaust gas (F3) by way of water scrubbing to render the thermally decomposed exhaust gas (F3) into a clean exhaust gas (F4).

The method according to the first feature of the present invention makes it possible to remove harmful substances of any kind of exhaust gas discharged from a semiconductor manufacturing plant whether the exhaust gas contains dust or not.

In accordance with a second feature of the present invention, there is provided a method for removing harmful substances of an exhaust gas (F1) discharged from semiconductor manufacturing equipment, comprising the steps of: removing at least one of a water-soluble component, hydrolyzable component and dust contained in the exhaust gas discharged from the semiconductor manufacturing equipment by water scrubbing; heating the water-scrubbed exhaust gas (F2) to thermally decompose a thermally-decomposable component contained therein; and removing dust generated by the thermal decomposition from the thermally-decomposed exhaust gas (F3) by way of water scrubbing to render the thermally-decomposed exhaust gas (F3) into a clean exhaust gas (F4); wherein the water-scrubbed exhaust gas (F2) is heated by utilizing heat obtained by heat exchange of the thermally-decomposed exhaust gas (F3) of high temperature, and a portion of dust (17) generated by the thermal decomposition which is accumulated at least in a thermal decomposition zone is intermittently removed by injecting compressed jet gas.

The method according to the second feature of the present invention makes it possible to remove harmful substances of any kind of exhaust gas discharged from a semiconductor manufacturing plant. In addition, the method reduces a power consumption of an electric heater by heat recovery, thereby reducing the running cost. Further, the dust (17) generated by the thermal decomposition of the water-scrubbed exhaust gas (F2) is removed at least from the thermal decomposition zone, so that the clogging by the dust (17) can be prevented. Thus, the method ensures stable operation during a prolonged continuous use.

In accordance with a third feature of the present invention, there is provided an apparatus for removing harmful substances of an exhaust gas discharged from a semiconductor manufacturing process, comprising: a water scrubber (1) for water-scrubbing an exhaust gas (F1) discharged from semiconductor manufacturing equipment to remove at least one of a water-soluble component, a hydrolyzable component and dust contained in the exhaust gas (F1); a thermal decomposition unit (4) for thermally decomposing a thermally-decomposable component contained in the water-scrubbed exhaust gas (F2); a heat exchanger (3) for heating the water-scrubbed exhaust gas (F2) by utilizing heat of the thermally-decomposed exhaust gas (F3) of high temperature; a spray device (7) for removing dust generated by the thermal decomposition from the thermally-decomposed exhaust gas (F3) of high temperature; a dust discharge device (6) disposed in the thermal decomposition unit (4), or in both the thermal decomposition unit (4) and the heat exchanger (3) for intermittently discharging dust accumulated in the thermal decomposition unit (4) or in both the thermal decomposition unit (4) and the heat exchanger (3) by injecting a compressed jet gas into the thermal decomposition unit (4) or into both the thermal decomposition unit (4) and the heat exchanger (3); and an air supply pipe (2) for mixing oxygen with the water-scrubbed exhaust gas (F2) at a point intermediate between the water scrubber (1) and the thermal decomposition unit (4).

The apparatus according to the third feature of the present invention removes the water-soluble component, hydrolyzable component and/or dust contained in the exhaust gas (F1) discharged from the semiconductor manufacturing equipment by means of the water scrubber (1), and thermally decomposes the thermally-decomposable component of the water-scrubbed exhaust gas (F2) by means of the thermal decomposition unit (4). Therefore, the apparatus can remove harmful substances of any kind of exhaust gas discharged from the semiconductor manufacturing plant.

In addition, the provision of the heat exchanger (3) allows for heat recovery, thereby reducing the power consumption of an electric heater (5) and hence the running cost.

Further, the apparatus removes the dust (17) contained in the thermally-decomposed exhaust gas (F3) by means of the spray device (7). Therefore, the clean exhaust gas (F4) without the dust (17) is discharged into the atmosphere. Since the concentrations of the individual component gases are reduced to levels lower than their TLVs by way of the aforesaid exhaust gas treatments, the exhaust gas discharged into the atmosphere does not cause any damage to the environment.

Furthermore, since the apparatus intermittently discharges the dust (17) accumulated in the thermal decomposition unit (4) or in both the thermal decomposition unit (4) and heat exchanger (3) by means of the dust discharge device (6), accidents due to the clogging by the dust (17) can be prevented. Thus, the apparatus ensures a stable operation during a prolonged continuous use.

In accordance with a fourth feature of the present invention, the thermal decomposition unit (4) of the apparatus according to the third feature includes as heating means a plurality of U-shaped bar heaters (5) which are disposed around an outlet port for the water-scrubbed exhaust gas (F2) preheated by the heat exchanger (3) in a casing (4a) of the thermal decomposition unit (4).

The apparatus according to the fourth feature, unlike an apparatus employing the aforesaid conventional method (4), allows the water-scrubbed exhaust gas (F2) to directly contact the bar heaters (5), thereby achieving an improved heat transfer to the water-scrubbed gas (F2). The apparatus can treat an exhaust gas discharged at various discharge rates, from a high discharge rate to a low discharge rate, to satisfy various operational conditions of a semiconductor manufacturing plant.

In accordance with a fifth feature of the present invention, there is provided an apparatus for removing harmful substances of an exhaust gas discharged from a semiconductor manufacturing process, comprising a water scrubber (1) connected to an exhaust gas discharging port of semiconductor manufacturing equipment via a duct (14) for water-scrubbing an exhaust gas (F1) discharged from the semiconductor manufacturing equipment to remove at least one of a water-soluble component, a hydrolyzable component and dust contained in the exhaust gas (F1); a thermal decomposition unit (4) for thermally decomposing a thermally-decomposable component contained in the water-scrubbed exhaust gas (F2); a heat exchanger (3) for heating the water-scrubbed exhaust gas (F2) by utilizing heat of the thermally-decomposed exhaust gas (F3) of high temperature; a spray device (7) connected to an exhaust duct (9) communicating with the atmosphere for removing dust generated by the thermal decomposition from the thermally-decomposed exhaust gas (F3) of high temperature; a dust discharge device (6) disposed in the thermal decomposition unit (4), or in both the thermal decomposition unit (4) and the heat exchanger (3) for discharging dust accumulated in the thermal decomposition unit (4) or in both the thermal decomposition unit (4) and the heat exchanger (3) by injecting compressed jet gas into the thermal decomposition unit (4) or into both the thermal decomposition unit (4) and the heat exchanger (3); an air supply pipe (2) for mixing oxygen with the water-scrubbed exhaust gas (F2) at a point intermediate between the water scrubber (1) and the thermal decomposition unit (4); a water tank (12) for collecting drainage from the water-scrubber (1), the thermal decomposition unit (4) and the spray device (7) which are disposed thereon; a water circulation pump (10) for mixing fresh water (19) supplied from the exterior with stored water (12a) in the water tank (12), and pumping up and feeding the mixed water to the water scrubber (1) and the spray device (7); and a drainage duct (11) for draining the stored water by an amount equal to that of the fresh water (19) supplied from the exterior.

In the apparatus according to the fifth feature of the present invention, the water scrubber (1) serving as an inlet of the exhaust gas (F1) is connected to the exhaust gas discharging port of the semiconductor manufacturing equipment via the duct (14), and the spray device (7) serving as an outlet of the clean exhaust gas (F4) is connected to the exhaust duct (9) communicating with the atmosphere. Therefore, the apparatus can be used in side-by-side relation to the semiconductor manufacturing equipment in a clean room.

These and other objects, features and advantages of the present invention will become apparent from the following detailed description.

DESCRIPTION OF THE PREFERRED EMBODIMENTS

Figure 1:
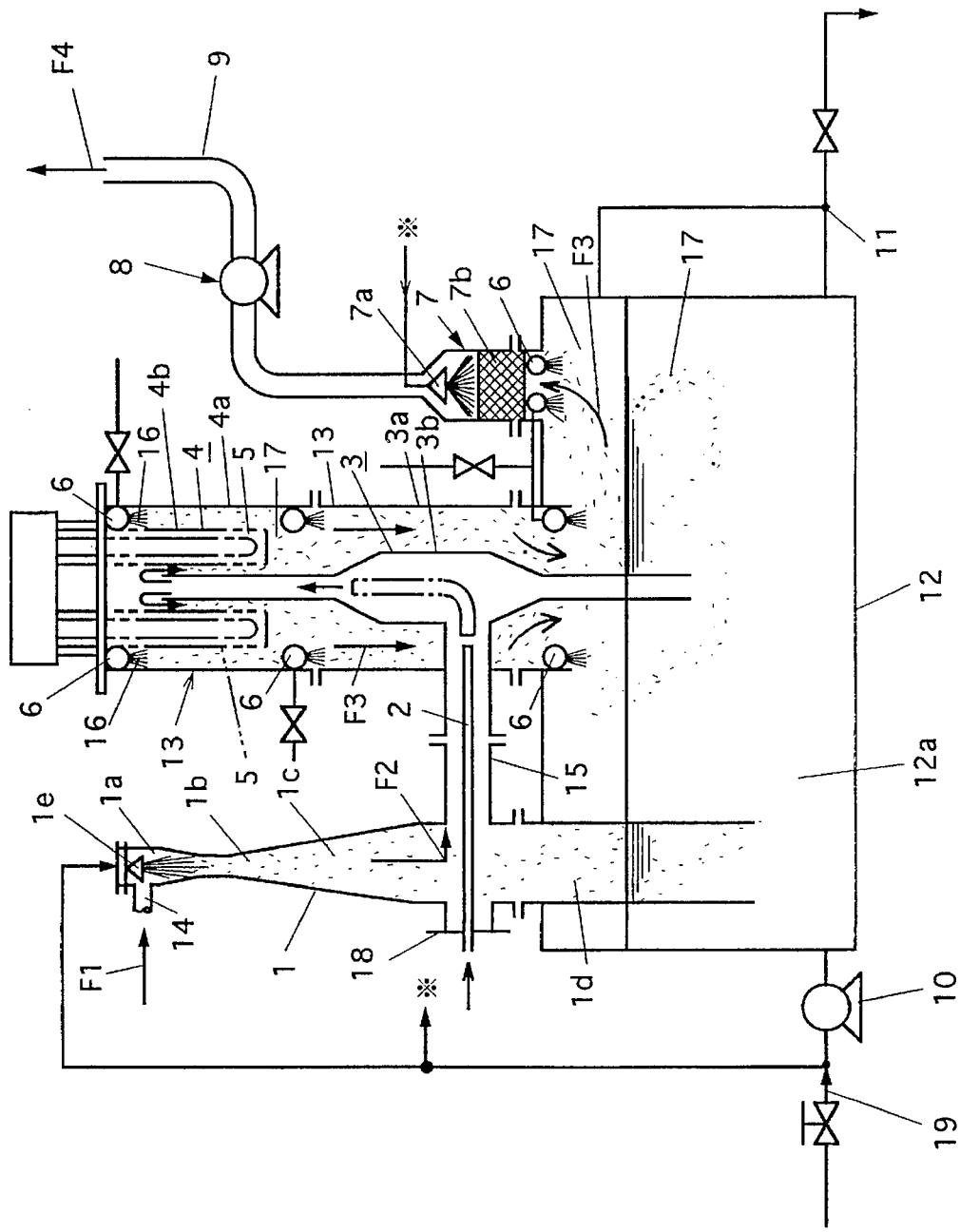
FIG. 1 is a schematic sectional view illustrating an exhaust gas flow in accordance with one embodiment of the present invention.

The present invention will now be described in detail by way of an embodiment thereof shown in the attached drawing. FIG. 1 is a schematic sectional view illustrating an exhaust gas flow in an apparatus of the present invention. As shown, a water scrubber 1 is connected to semiconductor manufacturing equipment of a plant via a duct 14. Exhaust gas F1 including residual gases used in a semiconductor manufacturing process and gases resulting from various chemical reactions of gases used in the semiconductor manufacturing process are introduced into the water scrubber 1.

The water scrubber 1 is disposed upright on a water tank 12, and has an upwardly flared portion 1a, a throat portion 1b following the flared portion 1a, a downwardly flared skirt portion 1c following the throat portion 1b, and a straight portion 1d following the skirt portion 1c. The straight portion 1d is immersed in stored water 12a reserved in the water tank 12. A spray nozzle 1e for spraying water toward the throat portion 1b is provided on a ceiling of the flared portion 1a.

A water circulation pump 10 for pumping up the stored water 12a in the water tank 12 to the spray nozzle 1e is disposed between the spray nozzle 1e and the water tank 12. The water circulation pump 10 mixes city water supplied thereto with the stored water 12a of the water tank 12 and pumps up the mixed water.

A thermal decomposition unit 4 is provided on a heat exchanger 3 integrally therewith. The heat exchanger 3 and the thermal decomposition unit 4 are disposed on the water tank 12 and adjacent the water scrubber 1. The heat exchanger 3 includes a cylindrical casing 3a, a heat exchanger body 3b housed in the cylindrical casing 3a, and an insulation material 13 wrapped around the cylindrical casing 3a. The heat exchanger body 3b communicates with the straight portion 1d of the water scrubber 1 via a communication pipe 15.

The thermal decomposition unit 4 includes a cylindrical casing 4a, a plurality of bar heaters 4b disposed in the casing 4a, and an insulation material 13 wrapped around the cylindrical casing 4a. A top opening of the heat exchanger body 3b opens centrally of bar heaters 4b, so that preheated water-scrubbed exhaust gas F2 is led to a thermal decomposition zone defined at a location at which the bar heaters are disposed.

A dust discharge device 6 is in the form of a nozzle connected to a high-pressure gas source, and is adapted to jet out a high-pressure jet gas 16 from the opening thereof.

If thermally-decomposed exhaust gas F3 explosively reacts with oxygen in air, the high-pressure gas to be injected into the apparatus is an inert gas such as nitrogen gas. On the other hand, if the thermally-decomposed exhaust gas F3 is not explosive, the gas to be injected is air. In this embodiment, the thermally-decomposed exhaust gas F3 is not explosive because explosive substances have already been decomposed, and therefore compressed air is used.

According to this embodiment, dust discharge devices 6 are disposed at ceiling and middle portions of the thermal decomposition unit 4, at the bottom opening of the heat exchanger 3 and at the inlet of a spray device 7, and adapted to jet the compressed jet gas 16 downward. The locations of the dust discharge devices 6 are not limited to the aforesaid locations, but the number and locations of the devices 6 can be determined as required.

The spray device 7 is disposed on the ceiling of the water tank 12. The thermally-decomposed exhaust gas F3 flowing into the water tank 12 from the bottom opening of the heat exchanger 3 flows into the spray device 7 through a clearance between the ceiling of the water tank 12 and the surface of water. The spray device 7 is, for example, a structure having a multiplicity of baffle plates 7b and a spray nozzle 7a accommodated therein.

The outlet of the spray device 7 is connected to an exhaust duct 9 communicating to the atmosphere. An exhaust fan 8 is provided in the midst of the exhaust duct 9.

Examples of exhaust gas F1 to be treated in accordance with the present invention include material gases for film formation and gases for cleaning which are used in semiconductor manufacturing equipment, and gases resulting from the decomposition of such gases. The exhaust gas F1 contains at least one of a water-soluble component, a hydrolyzable component and a thermally-decomposable component. Dust is contained or not contained in the exhaust gas F1.

Examples of hydrolyzable components include such gases as $SiH_2Cl_2$, $SiF_4$, $B_2H_6$ and $WF_6$, and TEOS (tetraethoxylsilan, $Si(OC_2H_5)_4$) gasified with a carrier gas. Examples of water-soluble components include acidic or basic gases such as $NH_3$, HCl, HF, $Cl_2$ and $F_2$. Examples of thermally-decomposable components include such gases as $SiH_4$, $Si_2H_6$, $PH_3$, $BF_3$ and $NF_3$.

One exemplary exhaust gas F1 which includes the mixture of the aforesaid components is a cleaning gas. After a film is formed on a surface of a semiconductor substrate with a gas for film formation such as $SiH_4$, the cleaning gas is used to remove an unnecessary solid material resulting from the film formation gas in a portion other than a desired portion of the semiconductor substrate. Representative cleaning gases are halogen compound gases (particularly fluorine-based gas, e.g., $NF_3$). $NF_3$ per se is not water-soluble nor hydrolyzable. When used as the cleaning gas in the semiconductor manufacturing equipment, however, substantial part of $NF_3$ decomposes to generate F or $F_2$. Where the aforesaid unnecessary solid material of silicon (Si) or a silicon compound such as $SiO_2$ or $Si_3N_4$ on the semiconductor substrate is to be cleaned, $NF_3$ of the cleaning gas reacts with silicon to generate hydrolyzable $SiF_4$. With the generation of $SiF_4$, $F_2$ and a small amount of HF may be generated. Since $SiF_4$ is hydrolyzable and $F_2$ and HF are water-soluble, these substances introduced along with $NF_3$ into the apparatus of the present invention are trapped or hydrolyzed in the water scrubber 1 and removed (this process will be described later in detail). The remaining $NF_3$ is introduced into the thermal decomposition unit 4, and thermally decomposed to into $N_2$ and $F_2$ mainly. Subsequently, water-soluble $F_2$ is dissolved in water by the spray device 7 and removed. Thus, the $NF_3$ gas is rendered unharmful by mainly the thermal decomposition into $N_2$ and $F_2$. Where $SiF_4$ is used as the source gas for film formation, a large amount of dust is generated, which is introduced along with the exhaust gas F1 into the water scrubber 1 and removed thereat by water scrubbing.

The exhaust gas F1 discharged from the semiconductor manufacturing apparatus is introduced into the flared portion 1a through the duct 14, and cleaned with high-pressure water mist sprayed from the spray nozzle 1e. The high-pressure water mist sprayed from the spray nozzle 1e is converged by the flared portion 1a, and compressed into a high-speed flow in the throat portion 1b. Thus, effective gas-liquid contact between the water and the exhaust gas F1 is achieved, whereby the water-soluble component, hydrolyzable component or dust is brought in contact with the sprayed water and removed by hydrolysis, dissolution or trapping.

Where $SiH_2Cl$ is contained in the exhaust gas F1, $SiH_2Cl$ is hydrolyzed to generate HCl and $(SiH_2O)_x$, which are in turn dissolved in the sprayed water.

The water supply to the spray nozzle 1e of the water scrubber 1 is achieved by pumping up the stored water 12a in the water tank 12 mixed with fresh water 19 supplied from the exterior by means of the water circulation pump 10.

Fresh water 19 is constantly supplied to the water circulation pump 10, while used water is allowed to overflow from the water tank 12 through a drainage duct 11 or to be drained from a bottom portion of the water tank 12 by an amount equal to the amount of water supplied to the water circulation pump 10.

An air supply pipe 2 is inserted into the heat exchanger body 3b of the heat exchanger 3 from an access door 18 formed on the straight portion 1d of the water scrubber 1 through a communication pipe 15. Air required for thermal oxidation or decomposition is supplied through the air supply pipe 2 by an air supply pump (not shown), and mixed with the water-scrubbed exhaust gas F2. The concentration of the exhaust gas F2 is preliminarily reduced to a level lower than its explosive lower limit (TLV) by diluting the exhaust gas F2 with an inert gas such as nitrogen.

The air supply pipe 2 may be inserted up to the inlet of the heat exchanger body 3b as indicated by a solid line or may extend through the heat exchanger body 3b as indicated by a phantom line. Alternatively, the air supply pipe 2 may extend only to a portion extending from the communication pipe 15 to the straight portion 1d so as to mix air with the exhaust gas F2 thereat. Though the air supply adjacent the straight portion 1d may ensure sufficient mixing of air with the exhaust gas F2, it is preferred in terms of safety consideration that the air supply pipe 2 extend through the heat exchanger body 3b.

The exhaust gas F2 water-scrubbed in the water scrubber 1 is introduced to the heat exchanger body 3b of the heat exchanger 3 through the communication pipe 15. In the heat exchanger body 3b, the exhaust gas F2 is mixed with air and, at the same time, receives thermal energy through a wall of the heat exchanger body 3b from the high-temperature exhaust gas F3 which is thermally oxidized or decomposed in the thermal decomposition unit 4 disposed in an upper portion of the apparatus. The exhaust gas F3 thus preheated is discharged from the top opening of the heat exchanger body 3b into a thermal oxidation-decomposition zone of the thermal decomposition unit 4.

A plurality of U-shaped electric bar heaters 5 are used as heating means in the present invention. The water-scrubbed exhaust gas F2 descends along surfaces of the electric bar heaters 5 so as to be thermally decomposed. The plurality of U-shaped electric bar heaters 5 are disposed around the discharge port of the heat exchanger body 3b in the casing 4a of the thermal decomposition unit 4. Accordingly, the preheated exhaust gas F2 is brought into sufficient contact with the electric bar heaters 5, so that the thermal decomposition is completed in a short time. Therefore, the dimensions of the thermal oxidation-decomposition zone can be reduced.

High-temperature exhaust gas F3 resulting from thermal oxidation generates a large amount of dust 17, which is in turn accumulated around the peripheral surfaces of the electric bar heaters 5 and the peripheral surfaces of the heat exchanger body 3b. The dust 17 thus accumulated is removed by means of dust discharge devices 6 to be described in detail later).

As described above, the water-scrubbed exhaust gas F2 descends from the thermal decomposition unit 4 toward the heat exchanger 3 while generating a large amount of dust 17 due to the thermal oxidation. The resulting thermally-decomposed exhaust gas F3 heats through the wall of the heat exchanger body 3b the water-scrubbed exhaust gas F2 ascending in the heat exchanger body 3b. After the heat exchange, the thermally-decomposed exhaust gas F3 is introduced into the water tank 12 through the bottom opening of the heat exchanger 3, and then into the spray device 7 through a clearance between the ceiling of the water tank 12 and the water surface. The introduction of the thermally-decomposed exhaust gas F3 into the spray device 7 is achieved by suction of the exhaust fan 8.

While a portion of the dust 17 is deposited on the electric bar heaters 5 and in the heat exchanger 3, most of the dust 17 descends along with the high-temperature exhaust gas F3, enters the stored water 12a in the water tank 12, and is then settled therein.

The thermally-decomposed exhaust gas F3 introduced into the spray device 7 along with the dust 17 is effectively scrubbed with water sprayed from the spray nozzle 7a with the aid of baffle plates 7b, and cooled to a lower temperature. The low-temperature clean exhaust gas F4 thus obtained is discharged from the exhaust duct 9 to the atmosphere. The spray nozzle 7a is supplied with the water which is pumped up by means of the water circulation pump 10 and branched thereto.

In accordance with the present invention, as described above, oxide dust is generated mainly within the thermal decomposition unit 4 of the apparatus during the thermal oxidation-decomposition and accumulated in the thermal decomposition unit 4 and the heat exchanger 3 with the lapse of time. This may result in a danger of clogging of the flow path of exhaust gas. As countermeasures thereagainst, the dust discharge devices 6 each comprised of the high-pressure gas jet nozzle are disposed at the ceiling of the thermal decomposition unit 4 and the bottom opening of the heat exchanger 3 as described above. The dust discharge devices 6 intermittently inject compressed air or nitrogen gas into the thermal decomposition unit 4 and heat exchanger 3 to sweep the accumulated dust 17 down to the water tank 12. The swept dust 17 which is usually in the form of fine particles first floats on the water surface, and disperses in the storage water 12a with the lapse of time.

A portion of the stored water 12a in the water tank 12 is discharged out of the water tank 12 from the drainage duct 11. As required, a filter (not shown) is provided before the drainage duct 11 to remove the dust as a solid mass.

In accordance with the present invention, the provision of the heat exchanger 3 allows for heat recovery to preheat the water-scrubbed exhaust gas F2. Therefore, power consumption of the electric heaters 5 can be significantly reduced.

The surface temperature of the electric heaters 5 is generally set to 600° C. to 900° C. for the treatment of the exhaust gas F1 discharged from a semiconductor manufacturing process for removal of harmful substances. The provision of the heat exchanger 3 enables a 20% to 30% saving of energy consumption, thereby reducing the running cost required for the semiconductor manufacture.

EXPERIMENT 1

An experiment was carried out in which $SiH_4$ gasses of various concentrations as shown in Table 1 were introduced into the apparatus of the present invention. In this experiment, the ratio of the surface area of the electric heaters 5 to the inner surface area of the thermal decomposition zone was set to one.

As a result, it was confirmed that the concentration of $SiH_4$ was reduced to a level lower than its TLV under any of the operational conditions shown below.

TABLE 1

| | | | | |
|---|---|---|---|---|
| Concentration of $SiH_4$ introduced (ppm) | 500 | 1,000 | 3,000 | 5,000 |
| Flow rate of gas (exhaust gas + air) (L/min) | 1,000 | 500 | 1,000 | 500 |
| Heater temperature (°C.) | 850 | 650 | 900 | 800 |
| Concentration of $SiH_4$ in exhaust gas (ppm) | <5 | <5 | <5 | <5 |

EXPERIMENT 2

An experiment was carried out in the same operational conditions as in EXPERIMENT 1, in which $NF_3/F_2$ exhaust gases of various concentrations were introduced to the apparatus at various flow rates as shown in Table 2. As can be seen from Table 2, the concentration of $NF_3$ was reduced to a level lower than its TLV (10 ppm) and the concentration of $F_2$ was reduced to a trace level.

TABLE 2

| | | | | |
|---|---|---|---|---|
| Concentration of introduced gases (ppm) | $NF_3$ | 500 | 1,500 | 3,000 |
| | $F_2$ | 100 | 200 | 250 |
| Flow rate of gas (exhaust gas + air) (L/min) | | 300 | 250 | 200 |
| Heater temperature (°C.) | | 900 | 850 | 900 |
| Concentration of gases in exhaust gas (ppm) | $NF_3$ | <0.5 | <5 | <1 |
| | $F_2$ | Tr | Tr | Tr |

In accordance with the method of the present invention, at least one of a water-soluble component, a hydrolyzable component and dust are removed from an exhaust gas discharged from a semiconductor manufacturing process by water-scrubbing, then a thermally-decomposable component in the water-scrubbed exhaust gas is thermally decomposed, and dust generated by the thermal decomposition in the thermally-decomposed exhaust gas is removed by water-scrubbing, whereby the exhaust gas is rendered clean and unharmful. Therefore, harmful substances of any kind of exhaust gas discharged from the semiconductor manufacturing process can be removed.

Since the water-scrubbed exhaust gas is heated by the heat exchange of the thermally-decomposed exhaust gas of high temperature, power consumption of the heater can be reduced, thereby reducing the running cost of the apparatus. Further, since the dust accumulated at least in the thermal decomposition zone is intermittently removed by compressed jet gas, accidents due to the clogging of the thermal decomposition zone by the dust can be prevented. This allows for a stable operation of the apparatus during a prolonged continuous use thereof.

The apparatus in accordance with the present invention having the aforesaid construction can not only remove harmful substances of any kind of exhaust gas discharged from a semiconductor manufacturing plant, but also discharge into the atmosphere a clean exhaust gas which contains no dust and has a concentration lower than its TLV. Further, the apparatus can reduce the running cost, and ensure stable operation thereof during a prolonged continuous use.

In addition, the effective arrangement of the bar heaters ensures higher heat transfer to the water-scrubbed exhaust gas. Therefore, the apparatus can treat exhaust gases discharged at various discharge rates, from a high discharge rate to a low discharge rate, to satisfy various operational conditions of a semiconductor manufacturing process.

Furthermore, since the water scrubber is connected to the exhaust discharge port of semiconductor manufacturing equipment via a duct and the spray device is connected to the exhaust duct communicating with the atmosphere, the apparatus of the present invention can be used in side-by-side relation to the semiconductor manufacturing equipment in a clean room.

While only certain presently preferred embodiments have been described in detail, as will be apparent with those familiar with the art, certain changes and modifications can be made in embodiments without departing from the spirit and scope of the invention as defined by the following claims.

What is claimed is:

1. An apparatus removing harmful substances of an exhaust gas discharged from a semiconductor manufacturing process, comprising:

a water scrubber water-scrubbing an exhaust gas discharged from semiconductor manufacturing equipment to remove at least one of a water-soluble component, a hydrolyzable component and dust contained in the exhaust gas;

a thermal decomposition unit thermally decomposing a thermally-decomposable component contained in the water-scrubbed exhaust gas;

a heat exchanger heating the water-scrubbed exhaust gas by utilizing heat of the thermally-decomposed exhaust gas;

a spray device removing dust generated by the thermal decomposition from the thermally-decomposed exhaust gas;

a dust discharge device disposed in one of the thermal decomposition unit, and both the thermal decomposition unit and the heat exchanger, said discharge device intermittently discharging dust accumulated in said one of the thermal decomposition unit and both the thermal decomposition unit and the heat exchanger by injecting compressed jet gas into said one of the thermal decomposition unit and both the thermal decomposition unit and the heat exchanger; and an air supply pipe mixing oxygen with the water-scrubbed exhaust gas at a point intermediate the water scrubber and the thermal decomposition unit.

2. An apparatus set forth in claim 1, wherein the thermal decomposition unit comprises heating means which includes a plurality of U-shaped bar heaters which are disposed around an outlet port for the water-scrubbed exhaust gas preheated by the heat exchanger in a casing of the thermal decomposition unit.

3. An apparatus as set forth in claim 1, wherein the thermal decomposition unit comprises a heater which includes a plurality of U-shaped bar heaters which are disposed around an outlet port for the water-scrubbed exhaust gas preheated by the heat exchanger in a casing of the thermal decomposition unit.

4. An apparatus removing harmful substances of an exhaust gas discharged from a semiconductor manufacturing process, comprising:

a water scrubber connected to an exhaust gas discharging port of semiconductor manufacturing equipment via a duct, said water scrubber water-scrubbing an exhaust gas discharged from the semiconductor manufacturing equipment and removing at least one of a water-soluble component, a hydrolyzable component and dust contained in the exhaust gas;

a thermal decomposition unit thermally decomposing a thermally-decomposable component contained in the water-scrubbed exhaust gas;

a heat exchanger heating the water-scrubbed exhaust gas by utilizing heat of the thermally-decomposed exhaust gas;

a spray device connected to an exhaust duct communicating with atmosphere and removing dust generated by the thermal decomposition from the thermally-decomposed exhaust gas;

a dust discharge device disposed in one of the thermal decomposition unit and both the thermal decomposition unit and the heat exchanger, said discharge device intermittently discharging dust accumulated in said one of the thermal decomposition unit and both the thermal decomposition unit and the heat exchanger by injecting compressed jet gas into said one of the thermal decomposition unit and both the thermal decomposition unit and the heat exchanger;

an air supply pipe mixing oxygen with the water-scrubbed exhaust gas at a point intermediate the water scrubber and the thermal decomposition unit;

a water tank collecting drainage from the water-scrubber, the thermal decomposition unit and the spray device which are disposed thereon;

a water circulation pump mixing fresh water supplied from the exterior with stored water in the water tank, and pumping up and feeding the mixed water to the water scrubber and the spray device; and a drainage duct draining the stored water by an amount equal to that of the fresh water supplied from the exterior.

* * * * *